May 29, 1923.
G. O. CURME, JR., ET AL
1,456,916
PROCESS OF MAKING CHLORHYDRINS
Filed May 12, 1922
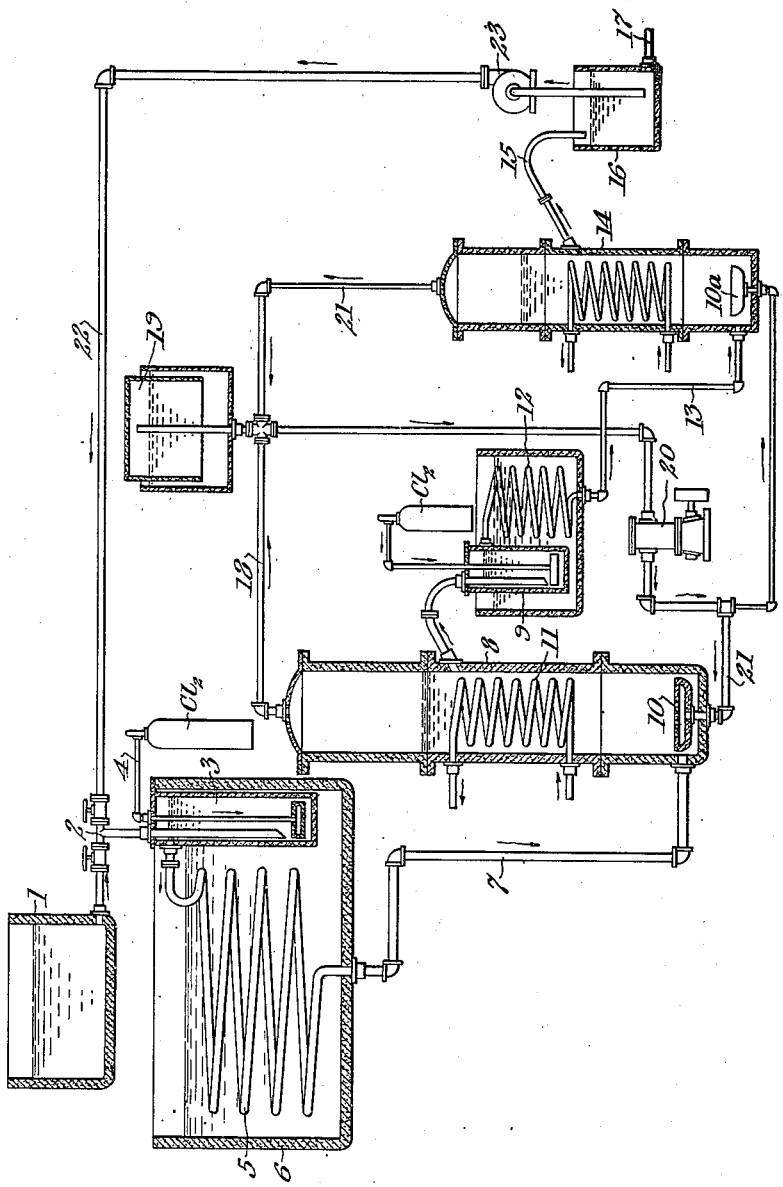
Inventors:
George O. Curme, Jr.,
Charles O. Young,
by Byrnes, Townsend & Brickenstein,
Attorneys.

Patented May 29, 1923.

1,456,916

UNITED STATES PATENT OFFICE.

GEORGE O. CURME, JR., OF CLENDENIN, WEST VIRGINIA, AND CHARLES O. YOUNG, OF ELMHURST, NEW YORK, ASSIGNORS TO CARBIDE AND CARBON CHEMICALS CORPORATION, A CORPORATION OF NEW YORK.

PROCESS OF MAKING CHLORHYDRINS.

Application filed May 12, 1922. Serial No. 560,391.

*To all whom it may concern:*

Be it known that we, GEORGE O. CURME, Jr., and CHARLES O. YOUNG, citizens of the United States, residing at Clendenin and Elmhurst, in the counties of Kanawha and Queens and States of West Virginia and New York, respectively, have invented certain new and useful Improvements in a Process of Making Chlorhydrins, of which the following is a specification.

This invention relates to the manufacture of chlorhydrins of hydrocarbons having an olefine linkage, the object of the invention being the provision of a simple process for the manufacture of these products with high operating efficiency and with a minimum production of objectionable by-products. The process will be described with specific reference to the preparation of ethylene-chlorhydrin, it being understood however that the procedure is applicable directly to the preparation of the corresponding compounds of other olefines, whether gaseous at usual temperatures or not. The term "olefine" is used herein to designate compounds having an olefine linkage, for example, the simple olefines of the ethylene series, the diolefines, and the various substituted olefines. The invention is not restricted to the details of procedure as hereinafter set forth, but the procedure described is that which has been found in practice to afford the maximum yields and in general the optimum results.

The process depends upon the well known fact that the chlorhydrins may be prepared by the direct union of olefines with hypochlorous acid in accordance with the equation:

(1) $C_2H_4 + HOCl = C_2H_4OHCl$.

For a full understanding of the present invention, reference is made to the accompanying drawing wherein the figure is a diagrammatic representation of a preferred form of apparatus for carrying the invention into effect.

For the preparation of the sodium hypochlorite solution for use in this process, a solution of iron-free caustic soda is treated with gaseous chlorin, with cooling to about 10° C., until it has been converted to an equimolecular solution of sodium hypochlorite and sodium chlorid in accordance with the equation (2) $NaOH + Cl_2 = NaOCl + NaCl + H_2O$.

This solution of sodium hypochlorite or liquid bleach differs from the commercial article only in being entirely iron-free and in containing but a very small proportion of free alkali, and, if properly cooled, practically no chlorate. It is preferably prepared in a concentration of 5% to 7% NaOCl, depending upon the concentration of chlorhydrin desired in the final solution. This final solution contains chlorhydrin in concentration approximately double the concentration of sodium hypochlorite in the initial solution. However, if desired, the sodium hypochlorite solution may be prepared by any other standard method, since the method of its preparation is not an essential part of the chlorhydrin process.

In connection with the following description, it is to be understood that the apparatus should be throughout constructed of acid-proof stoneware, or other appropriate materials having no injurious action upon the materials treated.

The hypochlorite solution contained in a storage reservoir 1 is permitted to flow through pipe 2 into a cell 3, hereinafter referred to as the first decomposing cell. This cell is preferably constructed of chemical stoneware and is cooled to a temperature of 0°–10° C. by immersion in a brine tank 6. Into this cell there is passed through inlet pipe 4 a finely divided stream of chlorin gas, in quantity sufficient to react with most but not quite all of the sodium hypochlorite present. The excess of hypochlorite, which may be in the neighborhood of 0.5–1.0%, is an active factor in eliminating any free chlorin which might tend to pass over with the solution into the reaction vessel beyond, and there to give rise to ethylene dichlorid and other undesirable by-products.

The reaction occurring in the cell 3 involves the setting free of hypochlorous acid and may be expressed by the equation:

(3) $NaOCl + Cl_2 + H_2O = 2HOCl + NaCl$.

From this first decomposing cell the solution containing free hypochlorous acid passes through a cooling coil 5 of chemical stoneware, which as illustrated is also immersed in the cooling tank 6. This coil insures thorough cooling of the solution, and also affords time for the reaction as expressed above to proceed to completion, so that no chlorin passes with the solution into the reaction tower.

The hypochlorous acid solution then flows directly through pipe 7 into the lower portion of the main reaction tower 8, which is also constructed of chemical stoneware. In this tower the hypochlorous acid collects and is maintained at a constant depth of several feet, overflowing into an auxiliary decomposing cell 9 as fast as it enters, after this depth has once been reached. A rapid stream of pure ethylene in finely distributed condition is passed into the reaction tower 8, preferably through a porous plate 10 located in the lower portion of the tower. Under these conditions the ethylene reacts rapidly with the free hypochlorous acid, forming ethylene chlorhydrin in accordance with the well known reaction represented in equation (1) above.

The rate of supply of ethylene is such that some excess will pass through tower 8 without undergoing reaction; and this excess passes through conduit 18 to a gas holder 19, from which it is withdrawn by pump 20 and returned through inlet pipe 21 to the tower 8. Thus the ethylene is continuously circulated through the tower until it is consumed, a fresh supply of ethylene being added as required in order to keep the reaction tower filled with pure ethylene at substantially atmospheric pressure. The reaction tower 8 is preferably equipped with a cooling coil 11, in order that the solution may at all times be maintained at a low temperature, say 0–10° C.

The solution as it leaves the reaction tower 8 consists chiefly of ethylene chlorhydrin, together with a small amount of residual free hypochlorous acid and some residual sodium hypochlorite. It also contains the sodium chlorid resulting from the previous reactions. This solution then flows into the auxiliary decomposing cell 9, which is also cooled to 0–10° C., and in which there is added sufficient additional chlorin to transform all of the residual sodium hypochlorite into free hypochlorous acid, and to leave the solution faintly acid with hydrochloric acid.

The solution overflowing from the auxiliary decomposing cell 9 passes through a cooling coil 12 to permit completion of the reactions; and then passes through conduit 13 into a second reaction tower 14, which is similar in construction to the tower 8, and is also preferably cooled to 0–10° C. Here again the solution is treated with pure ethylene supplied from the compressor 20 and distributed in minutely subdivided form through a porous plate $10^a$. In this tower practically all of the residual hypochlorous acid is caused to unite with the ethylene, with formation of further quantities of chlorhydrin. As in the case of the first reaction tower, the supply of ethylene is in excess of the requirements of the hypochlorous acid, and the uncombined excess flows through exit pipe 21 to the ethylene gas holder 19, and thence returns to the ethylene circulating system. The solution in the tower 14 is also permitted to collect to a considerable depth, overflowing through pipe 15 into a reservoir 16 from which it may be withdrawn through conduit 17 to the still to be further concentrated. Inasmuch as the larger part of the hypochlorous acid is consumed in the first reaction tower 8, the tower 14 may be of relatively small dimensions. It will be understood that other units similar to those described above may be provided if desired in order to bring the several reactions to substantial completion.

The solution contained in the reservoir 16, in addition to chlorhydrin, contains sodium chlorid, a trace of hydrochloric acid, and minute traces of oxidizing substances such as chlorates, hypochlorites, etc. In order to remove these traces of oxidizing substances it has been found preferable to treat the solution, before passing to the still, with a very slight excess of sodium bisulfite solution, and then to fully neutralize the free acid by calcium carbonate.

It is sometimes found desirable, in order to diminish the concentration of hypochlorous acid in the decomposing cell 3, to dilute the sodium hypochlorite solution passing into this cell by an aqueous solution free or substantially free from hypochlorite. This solution tends to increase the stability of the hypochlorous solution during the period previous to its entry into the reaction tower 8. Water may of course be employed as the diluting medium, but it has been found advantageous to use for this purpose a portion of the chlorhydrin solution already formed. For example, a part of this solution may be withdrawn from the reservoir 16 by means of a pump 23 and discharged by conduit 22, together with the sodium hypochlorite solution from the reservoir 1, into the decomposing cell 3. This procedure presents the advantage that, inasmuch as the dilution is being accomplished by a chlorhydrin solution of desirable strength for subsequent concentration, there is no reduction of the chlorhydrin content of the final solution such as would be the case if water was used as the diluting medium, but on the contary an augmentation of the chlorhydrin concentration.

By the process as described above it has been found possible to prepare directly chlorhydrin solutions of any desired strength up to 15-20% chlorhydrin. Such solutions are far more concentrated than can be prepared by known processes. Furthermore, the operation proceeds smoothly and with high yields. The concentration of the solution to any desired higher strength, as well as the removal of the salt present, is easily effected by ordinary distillation processes, as well understood by those skilled in this art.

We claim:—

1. Process of making chlorhydrins from olefines, comprising reacting with the hydrocarbon upon a solution containing free hypochlorous acid and a hypochlorite, thereby preparing chlorhydrin substantially free from ethylene or propylene chlorids; setting free hypochlorous acid from the residual hypochlorite; and reacting thereon with a further quantity of the hydrocarbon.

2. In a process of making chlorhydrins from olefines, the step which consists in bringing the hydrocarbon into reactive contact with a solution containing free hypochlorous acid and a hypochlorite.

3. In a process of making chlorhydrins from olefines, the step which consists in bringing the hydrocarbon into reactive contact with a solution containing free hypochlorous acid and a hypochlorite while maintaining said solution at a temperature below normal.

4. In a process of making chlorhydrins from olefines, the step which consists in bringing the hydrocarbon into reactive contact with a solution containing free hypochlorous acid and a hypochlorite while maintaining said solution at a temperature not in excess of 10° C.

5. In a process of making chlorhydrins from olefines, the steps which consist in bringing the hydrocarbon into reactive contact with a solution containing free hypochlorous acid and hypochlorite; withdrawing the solution containing the residual hypochlorite from contact with the hydrocarbon, and setting free hypochlorous acid therein; and reacting thereon with a further quantity of the hydrocarbon.

6. In a process of making chlorhydrins from olefines, the step which consists in diluting a hypochlorite solution with a solution containing chlorhydrin; setting free hypochlorous acid in the resulting mixed solution; and reacting thereon with the hydrocarbon to increase the chlorhydrin concentration.

In testimony whereof, we affix our signatures.

GEORGE O. CURME, Jr.
CHARLES O. YOUNG.